United States Patent
Scranton et al.

(10) Patent No.: US 7,137,820 B1
(45) Date of Patent: Nov. 21, 2006

(54) POTTY TRAINING CABINET

(76) Inventors: Brenda L. Scranton, 26333 E. Phillips Pl., Aurora, CO (US) 80016; Michael L. Scranton, 262 W. Sabal Palm Pl., Longwood, FL (US) 32779

( * ) Notice: Subject to any disclaimer, the term of this patent is extended or adjusted under 35 U.S.C. 154(b) by 456 days.

(21) Appl. No.: 10/402,546

(22) Filed: Mar. 28, 2003

(51) Int. Cl.
*G09B 19/00* (2006.01)

(52) U.S. Cl. .................................... 434/258

(58) Field of Classification Search ............... 434/236, 434/238, 247, 258
See application file for complete search history.

(56) References Cited

U.S. PATENT DOCUMENTS

| | | | | |
|---|---|---|---|---|
| 2,883,765 A * | 4/1959 | Blaine | ......................... | 434/238 |
| 4,162,490 A | 7/1979 | Fu et al. | | |
| 4,883,749 A | 11/1989 | Roberts et al. | | |
| 5,470,235 A * | 11/1995 | Papaleo | ...................... | 434/238 |
| 5,560,051 A * | 10/1996 | Butts | .............................. | 4/479 |
| 5,690,495 A * | 11/1997 | Collier | ........................ | 434/258 |
| 5,725,382 A * | 3/1998 | Walter et al. | ................ | 434/258 |
| 5,781,939 A | 7/1998 | Bledsoe | | |
| 5,890,242 A | 4/1999 | Minter | | |
| 5,954,512 A * | 9/1999 | Fruge | .......................... | 434/238 |
| 6,203,327 B1 * | 3/2001 | Ottrando | ...................... | 424/262 |
| 6,282,732 B1 * | 9/2001 | Krvavica et al. | ............... | 4/405 |
| 6,345,821 B1 * | 2/2002 | Labrot | ......................... | 273/236 |
| 6,572,380 B1 * | 6/2003 | Buckley et al. | ............. | 434/238 |
| 6,698,036 B1 * | 3/2004 | Armbruster et al. | ........... | 4/483 |
| 6,722,886 B1 * | 4/2004 | Blumberg | ................... | 434/236 |
| 6,772,454 B1 * | 8/2004 | Barry et al. | ................... | 4/661 |

* cited by examiner

*Primary Examiner*—Kurt Fernstrom
(74) *Attorney, Agent, or Firm*—Sturm & Fix LLP

(57) ABSTRACT

A cabinet is used for potty training. The cabinet is comprised of several doors behind which are compartments. The compartments are made to contain candy. A recorded message congratulates a child when a button is pushed, and directs the child to open one door to receive a piece of candy. The potty-training cabinet is colorfully decorated as to be appealing to a toddler.

8 Claims, 1 Drawing Sheet

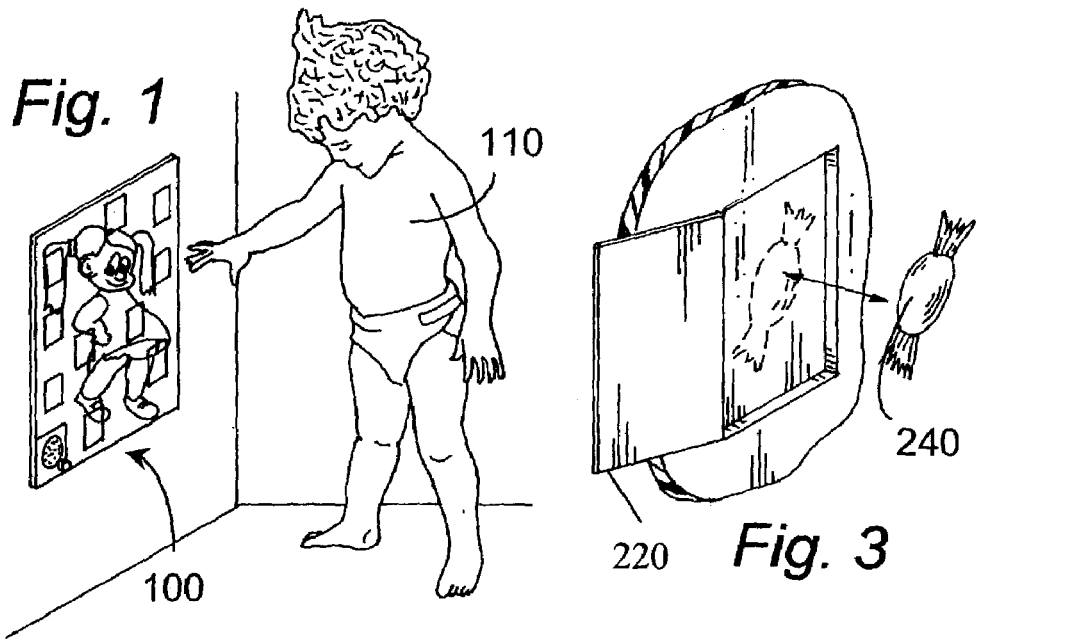
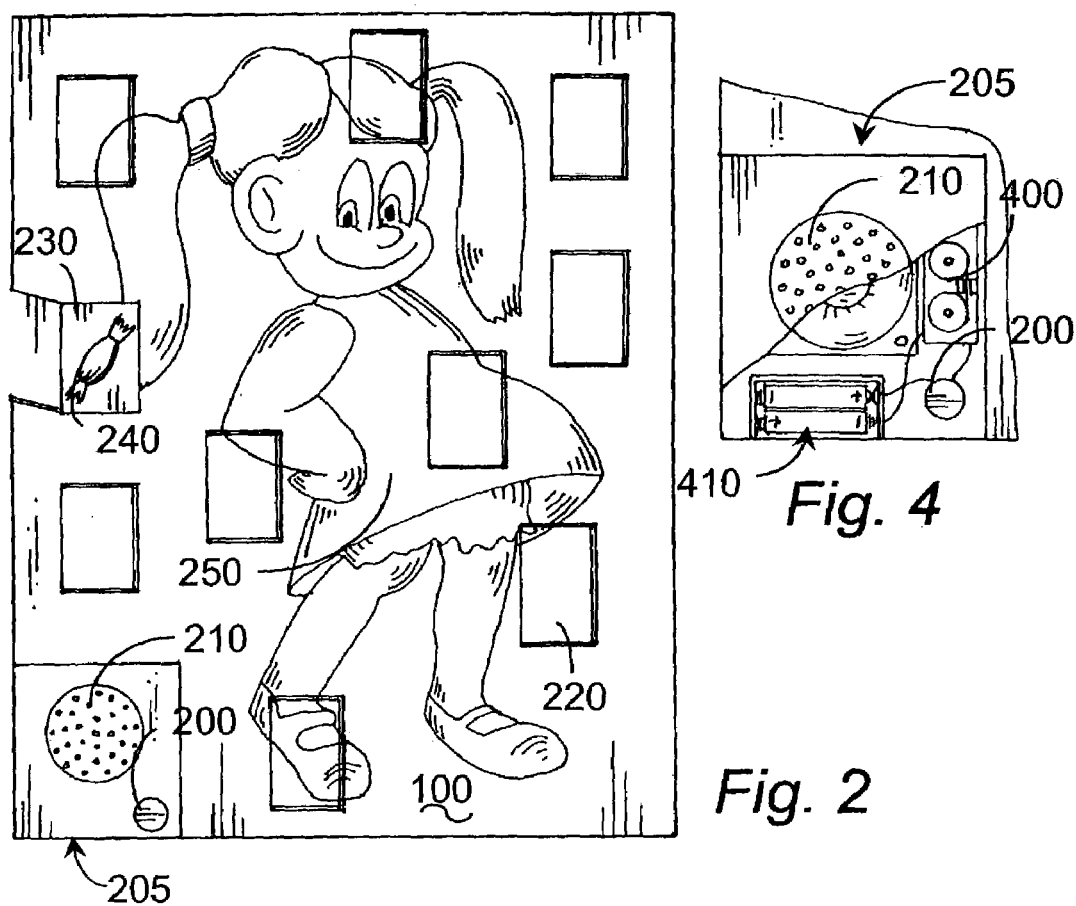

POTTY TRAINING CABINET

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally a method and device for child training. More particularly the present invention relates to a cabinet providing rewards for a potty training toddler.

2. Background Art

Positive reinforcement may be used to help a toddler through the transition period from diapers to being potty trained.

A battery-powered toilet training device is disclosed in U.S. Pat. No. 4,162,490. This invention uses a non-contact device to detect the presence of urine and stool in a receptacle. The invention produces an auditory signal and mechanical motion as a reward to the toddler.

A similar device is revealed in U.S. Pat. No. 4,883,749. Light from light emitting diodes is provided to determine when urine or stools cross the path of the light. Different sounds are emitted depending on whether urine, stool or both are detected. A moving part may also be used as an additional reward.

A potty training chair is disclosed in U.S. Pat. No. 5,781,939. The potty chair provides restraint for the toddler. Two audible rewards are given: one when the potty seat is raised, another when the child sits on the potty seat.

A potty training tool providing an audible reward is revealed in U.S. Pat. No. 5,890,242. The audible rewarding system is activated when a child hits, with a urine stream, a rotatable target.

All the above inventions provide positive reinforcement to a toddler going through potty training. They all include audible rewards, and some visual rewards. None, however, are made for a child to approach after finishing on the stool, and none provide a gustatorial reward.

There is, therefore, a need for a method and device for rewarding a child in potty training after the child has left the stool. There is also a need for a device that provides auditory, visual, and gustatorial reward for a toddler in potty training.

BRIEF SUMMARY OF THE INVENTION

A purpose of this invention is to provide a tool for rewarding a child undergoing potty training that is used after the child successfully uses the toilet. A second purpose is to provide auditory, visual, and gustatorial reward for a child in potty training.

A shallow cabinet is provided with multiple doors, each opening to a compartment sufficiently large to hold a piece of candy. Additionally, a pushbutton actuated audio recording is installed where the toddler can reach its activation button. Finally, the cabinet, itself, is decorated to be pleasing to a toddler's eye.

After using the stool, the child is instructed by an older person to push the button operating the audio recording. The recording is intended to entertain the toddler, and instructs the child to open one door and take a piece of candy.

The potty-training cabinet is provided with a magnet, hook, bail, wall mount, or stand for making it stand substantially upright, visible and reachable by the toddler.

The novel features which are believed to be characteristic of this invention, both as to its organization and method operation together with further objectives and advantages thereto, will be better understood from the following description considered in connection with the accompanying drawings in which presently preferred embodiments of the invention are illustrated by way of example. It is to be expressly understood however, that the drawings are for the purpose of illustration and description only and not intended as a definition of the limits of the invention.

BRIEF DESCRIPTION OF THE SEVERAL VIEWS OF THE DRAWINGS

FIG. 1 is a perspective view of a child approaching the invention, suspended to a wall;

FIG. 2 is a frontal elevation view of the potty training cabinet of the present invention;

FIG. 3 is a detail of a compartment and a piece of candy; and

FIG. 4 is a frontal elevation view of an audio recording delivery device.

DETAILED DESCRIPTION OF THE INVENTION

A potty-training cabinet 100 is shown suspended on a wall in FIG. 1. A child 110 is approaching the potty-training cabinet 100.

Details of the potty-training cabinet 100 are shown in FIG. 2. A pushbutton 200 activating an audio device 205 that produces a recorded message delivering it over a speaker 210 is provided in the potty-training cabinet 100. The recorded message comprises a congratulatory message and a directive to the child 110 to open one door 220 such as those shown closed in FIG. 2. Behind the door 220 is a shallow compartment 230 containing a piece of candy 240. The child 110 takes the candy as an additional reward for successful potty training. An extra, visual, reward is the decoration of the cabinet, such as a colorful picture of a child 250.

FIG. 4 is a detail of the audio device 205. The recorded message is saved on a storage device 400 such as a tape player, magnetic or light-read disk, or digital memory. The energy for the storage device 400 and speaker 210 is provided by batteries 410. Energy may, alternatively, be provided from the utility grid.

The above embodiment is the preferred embodiment, but this invention is not limited thereto. It is, therefore, apparent that many modifications and variations of the present invention are possible in light of the above teachings. Thus, it is to be understood that within the scope of the appended claims, the invention may be practiced otherwise than as specifically described.

We claim:

1. A method of providing rewards for a child in potty training after successfully using the potty, the method comprising the steps of:
   (a) providing a potty training cabinet with a plurality of doors, each door having a compartment behind it;
   (b) having the child open one door in the potty training cabinet; and
   (c) providing a gustatorial first reward in the compartment behind the door for the child; wherein the potty training cabinet is also provided with an audio recording as a second reward for the child; and wherein an audio message directs the child to open one door.

2. The method of claim 1 wherein the potty training cabinet is decorated to be visually appealing to the child, representing a third reward for the child.

3. The method of claim 1 wherein an audio message congratulates the child.

4. The method of claim 1 wherein the gustatorial reward is candy.

5. An apparatus for providing rewards for a child in potty training after successfully using the potty, the apparatus comprising;
   (a) a potty training cabinet with a plurality of doors, each door having a compartment behind it;
   (b) a gustatorial first reward in the compartment behind the door for the child;
   (c) an audio recording as a second reward for the child; and
   (d) an audio message directing the child to open one door.

6. The apparatus of claim 5 additionally comprising decoration to be visually appealing to the child, representing a third reward for the child.

7. The apparatus of claim 5 additionally comprising an audio message congratulating the child.

8. The apparatus of claim 5 wherein the gustatorial reward is candy.

* * * * *